ns sg rs, by dc
UNITED STATES PATENT OFFICE 2,433,255

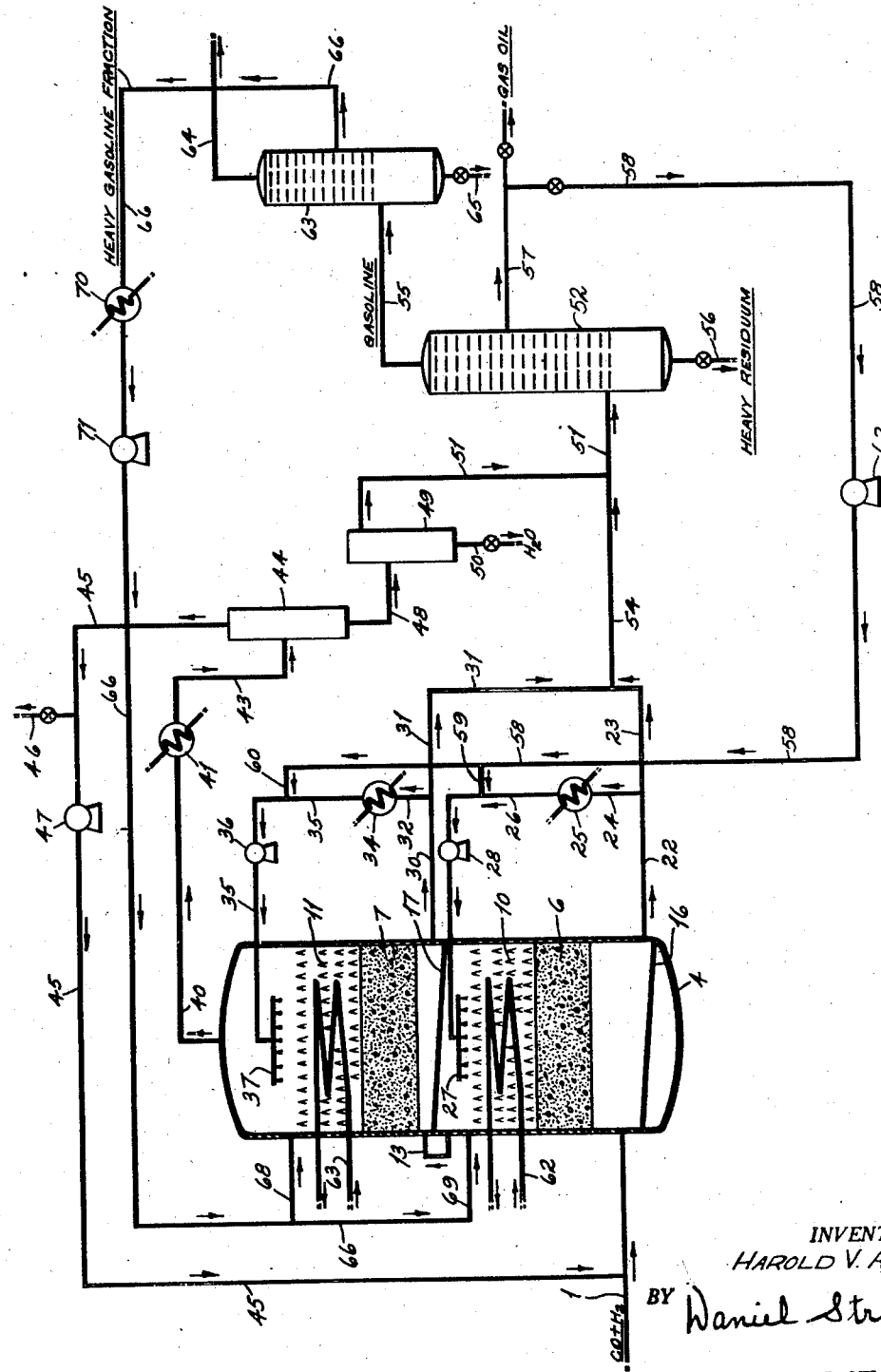

METHOD FOR SYNTHESIZING HYDROCARBONS AND THE LIKE

Harold V. Atwell, Beacon, N. Y., assignor to The Texas Company, New York, N. Y., a corporation of Delaware Application September 26, 1946, Serial No. 699,439

9 Claims. (Cl. 260—449.6)

This invention relates to a method for effecting the catalytic conversion of carbon monoxide and hydrogen into desired compounds by contact with catalyst particles disposed in a stationary mass.

In accordance with the method of the invention, a mass of catalyst in particle form is distributed throughout a plurality of stages, each stage comprising a bed of catalyst particles upon which is superimposed a layer of non-catalytic packing material. Carbon monoxide and hydrogen are converted into desired compounds by passage through the successive stages. The temperature is maintained within prescribed limits by direct contact of the catalyst particles in each stage with a cooling liquid. A substantial portion of the cooling liquid is vaporizable under the conversion conditions of temperature and pressure. Part of the non-vaporized cooling liquid is continuously withdrawn from the lower section of each stage. A fraction of the withdrawn liquid coolant is introduced into a separate unit for recovery of dissolved conversion products therefrom. Another portion of withdrawn liquid coolant is cooled and returned to the stage whence it was withdrawn at a point above the layer of non-catalytic packing material. The effluent from each catalyst bed is subjected to counter-current contact with recycled cooled liquid in the layer of non-catalytic material. High boiling components of the products and vaporized constituents of the cooling liquid in the effluent are condensed by this treatment and flow back to the catalyst bed.

The present invention provides an improved method of maintaining the temperature within the desired limits by direct contact cooling in fixed bed conversion of synthesis gas. The invention allows the use of a liquid coolant of wide boiling point range and combines direct contact evaporative cooling and direct contact sensible heat cooling in a commercially feasible operation. Pressure drop throughout the reactor unit is of a magnitude which is well within operable limits. The amount of liquid circulation and the extent of cooling surface area are reduced to a practicable level.

A gas oil fraction, which is obtained from the products of synthesis gas conversion, serves excellently as the liquid coolant in the process of the invention. In the selection of the gas oil fraction to be used as coolant, consideration is given to its boiling point range so that a substantial portion thereof is vaporizable under conversion conditions. The portion of the liquid coolant which is vaporizable under conversion conditions advantageously is of relatively narrow boiling point range so as to better confine the reaction temperature within the prescribed limits. The portion of coolant which is substantially non-vaporizable under conversion conditions may have a wide boiling point range. Part of the less volatile coolant is continuously cooled and recycled to effect scrubbing of the effluent from each catalyst bed.

During operation, partial conversion of synthesis gas into the desired products takes place in each stage. The heat liberated during such partial conversion volatilizes that portion of the liquid coolant which is vaporizable under conversion conditions. The reaction temperature is preserved within the desired limits by the absorption of reaction heat as the latent heat of vaporization of the vaporized coolant and as the sensible heat of that portion of the coolant which is not vaporized under conversion conditions.

An effluent issues from the catalyst bed of each stage which comprises products of conversion, unreacted synthesis gas and vaporized liquid coolant. This effluent passes into the layer of non-catalytic packing material wherein it is subjected to countercurrent contact with a cooled recycled portion of the less volatile components of the liquid coolant. A fraction of the less volatile components of the cooled liquid is continuously withdrawn from a trap tray situated in the bottom portion of each stage. The less volatile fraction of cooling liquid contains dissolved therein a considerable portion of the higher boiling constituents of the products of conversion and therefore a portion is continuously diverted to a unit wherein dissolved products are recovered from the liquid coolant. The greater portion of withdrawn fraction, however, is cooled and is then returned to a point above the layer of non-catalytic material. The cooled liquid flows downwardly through the layer of non-catalytic packing material and scrubs the effluent from each catalyst bed therein. Thorough and efficient scrubbing of the effluent is effected by countercurrent contact of cooled liquid with the gaseous effluent in the layer of porous packing material.

When conducting the conversion of carbon monoxide and hydrogen in accordance with this invention, there is effected a state of countercurrent flow in the catalyst bed which prevents flooding of the catalyst particles and channeling of the reactant gases therethrough. There is a continuous upflow of reactants, products and vaporized cooling liquid which is opposed by the continuous downflow of the circulating non-volatile fraction of the cooling liquid.

Many advantages accrue from employing the method of this invention for the catalytic conversion of carbon monoxide and hydrogen into desired compounds, the most important of which are summarized immediately hereafter. Many more advantages will be apparent from the detailed description which follows.

First, maximum heat removal is effected with a minimum amount of liquid circulation and smallest practicable cooling surface area. Secondly, the magnitude of the pressure drop through the reactor unit is maintained at an operable level. Thirdly, the present invention makes it feasible to use a liquid fraction of wide boiling point range to effect temperature control by direct contact of coolant with catalyst. Fourthly, channeling and flooding of the catalyst bed are eliminated. Fifthly, both the effluent stream from each stage and the catalyst surface are thoroughly scrubbed by recycled liquid coolant thereby removing higher boiling products therefrom.

Reference will now be made to the accompanying drawing from which a more detailed understanding of the invention may be obtained.

Synthesis gas comprising carbon monoxide and hydrogen at a predetermined ratio which may vary from about 2:1 to 1:4, but which is usually about 1:2 is obtained from a source not shown through a pipe 1.

Synthesis gas is introduced into a reactor 4 which may be maintained at pressures ranging from atmospheric to 1,000 lbs. per square inch and at temperatures ranging from about 250 to 750° F. The magnitude of the pressure and temperature employed depends upon the catalyst that is used and the nature of the products that are expected from the conversion.

For the purposes of illustration, conversion in the present description will be directed towards the production of liquid hydrocarbons in the gasoline range employing a cobalt catalyst. Temperatures in the range of 375° to 450° F. and atmospheric pressure have proven to be advantageous operating conditions for the conversion of synthesis gas into liquid hydrocarbons in the gasoline range using a cobalt catalyst.

The reactor 4 is divided into two stages. It is contemplated that the reaction unit may be divided into more than two stages, but only two are actually shown for the sake of simplicity. Each stage contains a catalyst bed which is designated by the numerals 6 and 7 in the stages shown. Superimposed upon each bed of catalyst is a layer of non-catalytic packing material which is designated by the numerals 10 and 11 in the respective stages. The conduit 13 provides fluid communication between the stages. There is positioned within the bottom of each stage a trap tray which is designated in the respective stages by the numerals 16 and 17.

Synthesis gas is converted into the desired products by contact with a cobalt catalyst in the bed 6. A substantial quantity of heat is liberated during this conversion. There is present in the catalyst bed 6 a quantity of cooling liquid. The portion of this cooling liquid which is vaporizable under the conditions of reaction advantageously boils within a narrow range so as to better confine the reaction temperature within prescribed limits.

The composition of a suitable coolant for a conversion employing a cobalt catalyst may be as follows; the volatile fraction comprising about 25 to 40 per cent of the total liquid coolant is a heavy gasoline fraction distilling in a narrow range defined by the temperatures of about 390 and about 415° F; the non-volatile fraction comprising about 60 to 75 of total coolant is a gas oil fraction distilling between 500 and 650° F. It is to be understood that the boiling point ranges of the volatile and non-volatile fractions of the cooling liquid will vary as conversion conditions of temperature and pressure change.

The more volatile portion of the cooling liquid is vaporized during the conversion of the gaseous reactants and issues from the catalyst bed together with unreacted synthesis gas and products of conversion. The less volatile fraction of the cooling liquid flows downwardly through the catalyst bed 6 and collects in the trap tray 16.

The less volatile fraction of the cooling liquid in the trap tray 16 contains higher boiling components of the products of conversion which are washed from the surface of the catalyst particles in the bed 6 and condensed from the gaseous effluent from each catalyst bed in the layer 10 by recycled coolant. The less volatile fraction of the cooling liquid and the conversion products dissolved therein are continuously withdrawn from the trap tray 16 through a pipe 22. A portion of this withdrawn liquid is continuously diverted through a pipe 23 to a product recovery system, which will be described later.

The major portion of the liquid withdrawn from the trap tray 16 is introduced into an exchanger 25 through a pipe 24. In the exchanger 25, the temperature of the liquid is reduced to a temperature of about 50 to 150° F. below conversion temperature. From the exchanger 25, the coolant is returned through a pipe 26 to the stage from which it was withdrawn at a point above the layer 10 of non-catalytic packing material. A distributor 27 is used to insure even apportionment of the cooling liquid along the horizontal dimensions of the layer 10. A pump 28 inserted in the line 26 is used to circulate the cooling liquid.

In the non-catalytic layer 10, the gaseous effluent from the catalyst bed 6 comprising vaporized components of the cooling liquid, products of conversion and unreacted carbon monoxide and hydrogen is subjected to counter-current contact with the cooled recycled high boiling liquid coolant. The layer of non-catalytic packing material provides means of efficient scrubbing of the effluent from the catalyst bed 6. Vaporized components of the cooling liquid and higher boiling products of conversion are condensed by counter-current contact of the effluent with the cooled recycled fraction of the liquid coolant.

There continuously flows from the layer 10 onto the catalyst bed 6 a liquid which comprises recycled higher boiling fraction of the cooling liquid, more volatile components of the cooling liquid and high boiling conversion products, both of the latter two having been condensed from the effluent of the catalyst bed 6 by the counter-current contact with cooling liquid. In the catalyst bed 10 the more volatile components of the liquid coolant are re-vaporized, thereby absorbing further heat of reaction. The high boiling fraction of the liquid coolant and condensed high boiling components of the products flow downwardly through the catalyst bed 6. A two-fold function is effected by this downward flow of liquid; first, additional heat of reaction is absorbed as the sensible heat of the downflowing liquid; secondly, waxy conversion products which tend to accumulate on the surface of the catalyst are continuously washed therefrom.

From the catalyst bed 6, this downflowing liquid passes into the trap tray 16. Its treatment thereafter has been described in detail previously.

The effluent from the layer 10, which has been thoroughly scrubbed by countercurrent contact with the recycled cooling liquid, passes into the second stage of the reactor 4 through a conduit 13. This gas stream comprises unreacted synthesis gas and the lower boiling products of conversion which constitute, for example, hydrocarbon boiling below about 375° F.

In the second stage, further conversion of synthesis gas is effected. The temperature is maintained within the desired limits by direct contact with a liquid coolant, as has been described in detail for the first stage.

High boiling liquid coolant, together with the dissolved products of conversion, is removed from the trap tray 17 through a pipe 30. A portion of this withdrawn coolant is led to a product recovery system through a pipe 31. A major portion is introduced through a pipe 32 into an exchanger 34 wherein the temperature is reduced to about 100° F. below conversion temperature. The cooled liquid is returned to the second stage through a pipe 35, a pump 36 and a distributor 37. The effluent from the catalyst bed 7 is scrubbed by countercurrent contact with the recycled liquid coolant in the layer of non-catalytic packing material 11.

An effluent comprising mainly products of conversion including carbon dioxide and a small percentage of unreacted synthesis gas leaves the reactor 4 through a pipe 40. The pipe 40 leads to a condenser 41 in which normally liquid components of the effluent are condensed. Condensed and uncondensed components of the effluent flow into a gas-liquid separator 44 through a pipe 43.

The gaseous components of the effluent comprising carbon dioxide, normally gaseous hydrocarbons such as ethane, propane, butane and unreacted carbon monoxide and hydrogen leave the gas-liquid separator 44 through the pipe 45 and are recycled therethrough at least in part to the reactor 4. A vent 46 provides means of discharging the unrecycled portion of this gas stream. The portion of the gas stream discharged from the vent 46 may be used as fuel or treated so as to recover valuable constituents therefrom. The portion of the gaseous products of conversion which is to be used as recycle gas is pumped along the pipe 45 by means of a pump 47 and is introduced into the pipe 1 where it combines with the fresh synthesis gas prior to introduction into the reactor 4.

The condensed components of the effluent are withdrawn from the gas-liquid separator 44 through a pipe 48 and are introduced into another separator 49. The separator 49 serves to separate water from the liquid hydrocarbons. Water is discharged from the separator 49 through a pipe 50.

Liquid hydrocarbons are withdrawn from the separator 49 through a pipe 51 and are introduced into a fractionating tower 52 wherein they are separated into various valuable fractions.

The cooling liquid, which is diverted from the recycled liquid coolant through the pipes 23 and 31 for the recovery of dissolved products of conversion therefrom, is introduced into the pipe 51 leading to the fractionating tower 52 through a pipe 54.

From the fractionating tower 52, various fractions of conversion products are obtained as well as a fraction of wide boiling point range which may be used to replenish cooling liquid in each stage. Gasoline is withdrawn from the fractionating tower through a pipe 55. Heavy residuum is withdrawn from the tower through a pipe 56.

Gas oil is withdrawn from the tower through a pipe 57. Part of this gas oil fraction is piped to storage and a portion thereof is used to supplement the liquid coolant employed in the reactor 4. Gas oil fraction used to replenish the liquid coolant is diverted from the pipe 57 through a pipe 58 and is returned therethrough to the reactor 4. The pipe 58 serves as a manifold pipe for introducing additional quantities of liquid coolant into each stage through pipes 59 and 60. A pump 62 is inserted in pipe 58 to aid in the return of coolant to the reactor 4.

The volatile fraction of the coolant may be replenished by separating from the gasoline fraction in a fractionating tower 63 a heavy gasoline fraction boiling between about 390° and 415° F. through a manifold pipe 66, and introducing it into the stages of the reactor 4 through pipes 68 and 69 which connect with manifold pipe 66. An exchanger 70 is inserted in pipe 66 to cool this gasoline fraction before its return to reactor 4. A pump 71 is used to effect flow of this gasoline fraction along pipe 66. Light gasoline components are removed from the fractionating tower through pipe 64 and bottoms are removed through pipe 65.

It is possible to effect cooling of the recycled less volatile components of the liquid coolant actually within the layers of non-catalytic packing material 10 and 11 by inserting cooling coils therein. In the drawing, cooling of the recycled liquid coolant is shown taking place in an exchanger which is external to the reactor 4. However, it is possible to effect cooling of this liquid in the interior of the reactor 4 by inserting cooling coils 62 and 63 in the layers of non-catalytic packing material.

It is contemplated that catalysts other than cobalt may be used to effect the conversion of synthesis gas. Iron and nickel catalysts, which may be either supported or unsupported, may also be used to convert synthesis gas into hydrocarbons and oxygenated hydrocarbons. The catalyst employed whose active hydrogenating metal is either iron, nickel, cobalt or a mixture of these, contains advantageously one or more promoters. The oxides of thorium, magnesium, aluminum, vanadium, potassium, manganese and silicon have proven to be useful promoters.

The invention has been described using a gasoline-gas-oil fraction derived from the products of conversion as a liquid coolant. It should be understood, however, that other liquid coolants obtained from an external source may be employed. Specifications for a liquid to be used as a coolant in the process of the invention are as follows: first, the coolant should have a wide boiling point range so that a substantial portion thereof is vaporizable under conversion conditions while the remainder is non-vaporizable; secondly, the vaporizable portion should be of relatively narrow boiling point range; thirdly, the coolant should be stable under conversion conditions and should not have a deleterious effect upon the catalyst. An example of a coolant derived from an external source is a mixture of cycle gas oil and of alkylate which boils at conversion conditions within a relatively narrow boiling point range.

While the invention has been described in connection with the catalytic conversion of carbon monoxide and hydrogen into hydrocarbons, oxygenated hydrocarbons and the like, it is contemplated that the invention can be readily adapted to other conversions of gaseous reactants by contact with a catalyst in solid particle form which are accompanied by the liberation of substantial exothermic heat of reaction and in which conversions it is imperative to maintain the catalyst within a prescribed temperature range.

While the invention has been described with the various stages of the process being incorporated in a single chamber, it should be understood that the separate operations can take place in separate and distinct chambers which are connected by suitable conduits and pumps for the flow of fluid materials. Thus not only may each stage comprising catalyst particles upon which is superimposed a layer of non-catalytic packing material constitute a separate chamber but it is also possible for each bed of catalyst particles and each layer of non-catalytic packing material to be situated in a separate chamber.

Obviously many modifications and variations of the invention, as hereinbefore set forth, may be made without departing from the spirit and scope thereof and, therefore, only such limitations should be imposed as are indicated in the appended claims.

I claim:

1. In exothermic conversions of gaseous reactants by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing non-vaporized coolant from each stage, continuously cooling said withdrawn non-vaporized coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough so as to scrub said effluent from each of said catalyst beds and condense the higher boiling components of said effluent including vaporized coolant and removing products of reaction from the upper portion of said reaction zone.

2. In exothermic conversions of gaseous reactants by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing from each stage non-vaporized coolant containing dissolved therein products of conversion, diverting part of said withdrawn coolant to a product recovery system for the separation of products therefrom, continuously cooling the remainder of said withdrawn coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough so as to scrub the effluent from each of said catalyst beds and condense the higher boiling components of said effluent including vaporized coolant and removing products of reaction from the upper portion of said reaction zone.

3. In exothermic conversions of gaseous reactants by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under conditions prevailing within said catalyst bed, passing an effluent comprising conversion products, unconverted reactants and vaporized coolant from said lower catalyst bed to said upper non-catalytic bed in each stage, continuously withdrawing non-vaporized coolant containing products of reaction dissolved therein from each stage, diverting part of said withdrawn coolant to a product recovery system for the separation of products of conversion therefrom, continuously restoring the content of non-vaporized coolant by recycling said non-vaporized coolant from said product recovery system, continuously cooling the remainder of said withdrawn coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough so as to effect scrubbing the effluent from each of said catalyst beds and condense the higher boiling components of said effluent including vaporized coolant and removing products of reaction from the upper portion of said reaction zone.

4. The method according to claim 1 in which 25 to 40 per cent of the coolant is vaporizable under conditions prevailing within the catalyst bed of each stage.

5. In exothermic conversions of gaseous reactants by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form wherein means for effecting cooling are inserted, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing from each stage non-vaporized coolant containing dissolved therein products of conversion, diverting part of said withdrawn coolant to a product recovery system for the separation of products therefrom, continuously cycling the remainder of said withdrawn coolant to a point above said upper bed of non-catalytic contact material, passing said non-vaporized coolant downwardly through said upper bed in counter-current contact to the effluent from each catalyst bed rising therethrough, cooling said non-vaporized coolant by contact with the cooling means inserted within said bed of non-catalytic contact material, scrubbing the effluent from each of said catalyst beds and effecting condensation of the higher boiling components of said effluent including vaporized coolant during said countercurrent contact of non-vaporized coolant and effluent and removing products of reaction from the upper portion of said reaction zone.

6. In exothermic conversions of gaseous reactants by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing from the lower portion of each stage non-vaporized coolant containing dissolved therein products of conversion, diverting part of said withdrawn coolant to a product recovery system for the separation of products therefrom, continuously cooling the remainder of said withdrawn coolant, returning said cooled non-vaporized coolant to each stage at a point above said upper bed of non-catalytic contact material, passing said non-vaporized coolant downwardly through said upper bed in counter-current contact to the effluent from each catalyst bed so as to scrub the effluent from each of said catalyst beds and condense the higher boiling components of said effluent including vaporized coolant, passing condensed components of said effluent and non-vaporized coolant downwardly through said catalyst bed so as to effect further absorption of heat of reaction and removing products of reaction from the upper portion of said reaction zone.

7. In the exothermic conversion of carbon monoxide and hydrogen into hydrocarbons, oxygenated hydrocarbons and the like by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing non-vaporized coolant from each stage, continuously cooling said withdrawn non-vaporized coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough so as to scrub said effluent from each of said catalyst beds and condense the higher boiling components of said effluent including vaporized coolant and removing products of reaction from the upper portion of said reaction zone.

8. In the exothermic conversion of carbon monoxide and hydrogen into hydrocarbons, oxygenated hydrocarbons and the like by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under the conditions prevailing within said catalyst bed, passing an effluent comprising conversion products, unconverted reactants and vaporized coolant from said lower catalyst bed to said upper non-catalytic bed in each stage, continuously withdrawing from each stage non-vaporized coolant containing dissolved therein products of conversion, diverting part of said withdrawn coolant to a product recovery system for the separation of products therefrom, continuously cooling the remainder of said withdrawn coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough, so as to scrub the effluent from each of said catalyst beds and condense the higher boiling components of said effluent including vaporized coolant and removing products of reaction from the upper portion of said reaction zone.

9. In the exothermic conversion of carbon monoxide and hydrogen into hydrocarbons, oxygenated hydrocarbons and the like by contact with a conversion catalyst in solid particle form within a predetermined temperature range, the method comprising passing gaseous reactants upwardly through a series of conversion stages spaced apart within a reaction zone, each stage comprising a lower bed of catalyst and an upper bed of non-catalytic contact material in solid particle form, effecting partial conversion of gaseous reactants in each stage, maintaining catalyst particles in each of said beds in direct contact with a liquid coolant, said coolant being partially vaporizable under conditions prevailing within said catalyst bed, passing an effluent comprising conversion products, unconverted reactants and vaporized coolant from said lower catalyst bed to said upper non-catalytic bed in each stage, continuously withdrawing non-vaporized coolant containing products of reaction dissolved therein from each stage, diverting part of said withdrawn coolant to a product recovery system for the separation of products of conversion therefrom, continuously restoring the content of non-vaporized coolant by recycling said non-vaporized coolant from said product recovery system, continuously cooling the remainder of said withdrawn coolant, returning said cooled non-vaporized coolant to each stage at a point above said upper bed of non-catalytic contact material, passing said non-vaporized coolant downwardly through said upper bed in counter-current contact to the effluent from each catalyst bed rising therethrough so as to effect scrubbing the effluent from each of said catalyst beds and condense the higher boiling components of said effluent including vaporized coolant and removing products of reaction from the upper portion of said reaction zone.

HAROLD V. ATWELL.

REFERENCES CITED

The following references are of record in the file of this patent:

UNITED STATES PATENTS

| Number | Name | Date |
|---|---|---|
| 2,167,004 | Pier et al. | July 25, 1939 |
| 2,248,734 | Barr | July 8, 1941 |
| 2,256,622 | Murphree | Sept. 23, 1941 |
| 2,406,851 | Redcay | Sept. 3, 1946 |
| 2,411,760 | Sensel | Nov. 26, 1946 |